June 23, 1964
J. C. MANSHEL
3,137,914
TOOL FOR TRIMMING CARTRIDGES
Filed Sept. 11, 1961
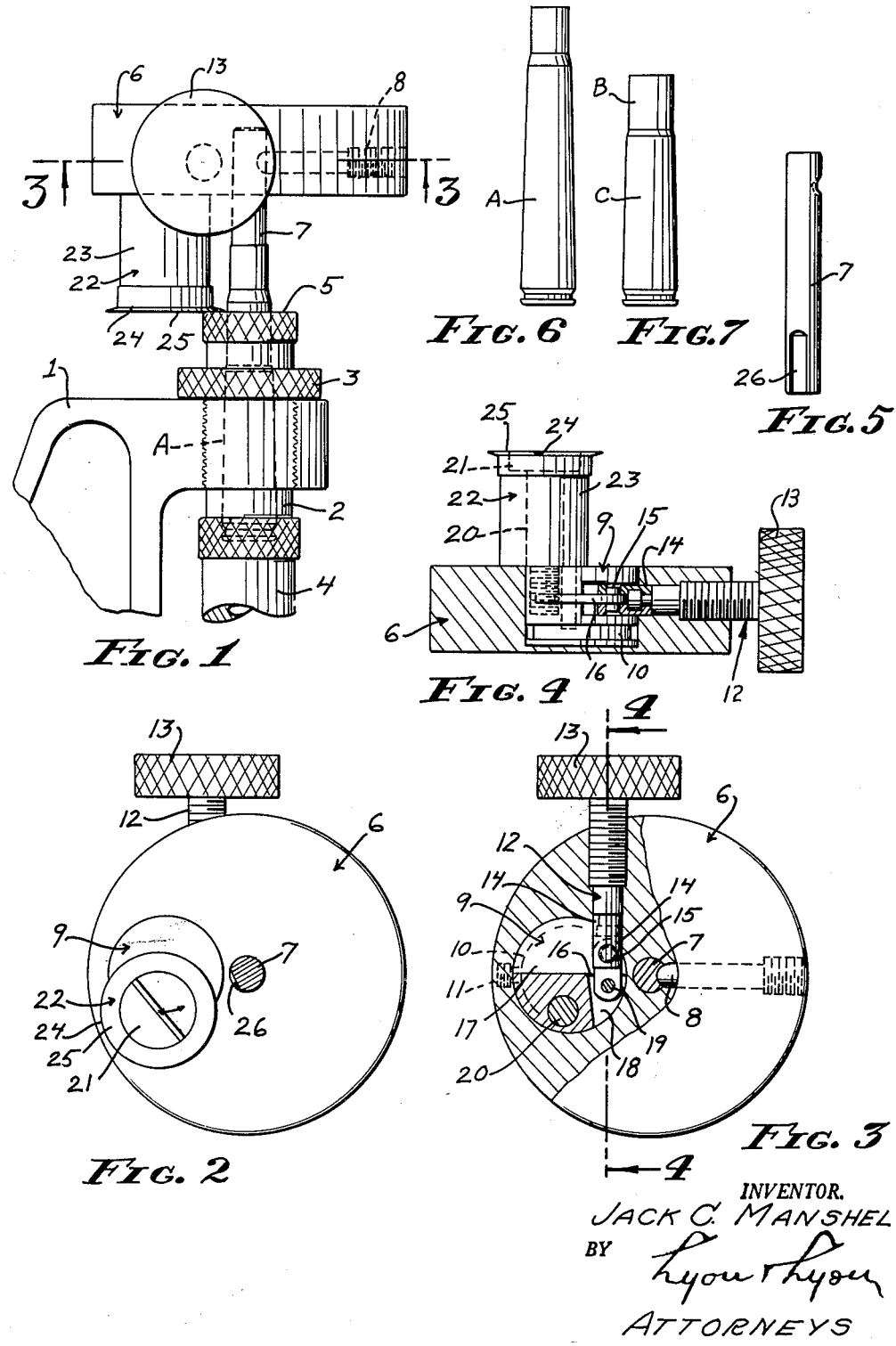
INVENTOR.
JACK C. MANSHEL
BY Lyon & Lyon
ATTORNEYS United States Patent Office 3,137,914
Patented June 23, 1964

3,137,914
TOOL FOR TRIMMING CARTRIDGES
Jack C. Manshel, 38941 Juniper Tree Road,
Palmdale, Calif.
Filed Sept. 11, 1961, Ser. No. 137,387
4 Claims. (Cl. 29—1.32)

This invention relates to tools for trimming cartridges, that is to tools employed in conjunction with cartridge shell swaging or reforming tools to trim or cut the end of a reformed cartridge shell. Included in the objects of this invention are:

First, to provide a tool for trimming cartridges which performs its trimming operation while the cartridge case is still held by the reforming die.

Second, to provide a tool for trimming cartridges which is adapted for use by hobbyists in that it may be used effectively with a minimum of instruction and may be depended upon to trim a cartridge shell at precisely the correct place without the use of measuring tools.

Third, to provide a tool for trimming cartridges which is simple and inexpensive in construction.

With the above and other objects in view as may appear hereinafter, reference is directed to the accompanying drawings, in which:

FIGURE 1 is a fragmentary view showing a portion of a conventional shell reforming tool and illustrating the manner of use of the cartridge shell trimming tool in connection therewith.

FIGURE 2 is a bottom view of the tool for trimming cartridge shells with the mandrel shown in section.

FIGURE 3 is a partial bottom, partial sectional view thereof, the sectional portion being taken through 3—3 of FIGURE 1.

FIGURE 4 is a sectional view thereof taken through 4—4 of FIGURE 3.

FIGURE 5 is a side view of the mandrel which is inserted into a cartridge shell.

FIGURE 6 is a side view of a conventional cartridge shell which is to be reformed and trimmed.

FIGURE 7 is a similar side view of the cartridge shell after it has been reformed and trimmed.

The tool for trimming cartridge shells is adapted to be used in conjunction with a cartridge shell reforming machine or tool which includes a frame 1 shown fragmentarily in FIGURE 1. Screw-threaded into the frame 1 is a reforming die 2 which is locked in place by a lock nut 3. A ram 4 indicated fragmentarily in FIGURE 2 is adapted to force a cartridge shell A shown by solid lines in FIGURE 6 and by broken lines in FIGURE 1 into the reforming die to form a bullet receiving sleeve B of slightly larger diameter than the initial bullet receiving sleeve. In order to form the new cartridge shell C as shown in FIGURE 7, it is necessary that the excess length be trimmed. The trimming operation is accomplished by the tool which will be hereinafter described. The plane at which the cartridge shell is to be trimmed is determined by the upper face or shoulder 5 of the reforming die. The reforming die, which is conventional, serves to hold the cartridge shell C against rotation.

The tool for trimming cartridge shells includes a supporting disc 6 having a socket which receives a mandrel 7 held therein by the set screw 8. A set of mandrels are employed corresponding to the diameters of various types of cartridge shells.

At one side of the mandrel, the supporting disc is provided with a cylindrical socket which receives a generally cylindrical cutter feed member 9. The feed member is provided with a retainer groove 10 which receives a set screw 11 to permit rotation of the feed member but to prevent axial displacement.

Extending tangentially with respect to the cutter feed member 9 is a screw threaded bore within the supporting disc which receives a feed screw 12. The outer protruding end of the feed screw is provided with a knob 13. The inner end of the feed screw is provided with an annular groove which journals one end of a swivel 14. The swivel may be formed of complementary halves joined together by a rivet pin 15 which also serves to pivot one end of a link 16 which extends from the feed screw into the feed member 9. The feed member 9 is provided with a clearance slot 17 and intersecting slit 18 which receives a journal pin 19 adapted for pivotal connection to the extended end of the link 16.

The swivel 14 and link 16 translate axial movement of the feed screw 12 to arcuate movement of the feed member 9.

Screw threaded into the feed member 9 in eccentric relation to its axis is a cutter shaft 20 which extends from the supporting disc 6 in parallel relation to the mandrel 7. The cutter shaft 20 is provided with a head 21 and is adapted to receive a rotatable cutter 22 having a cylindrical body 23 terminating at its extended end in a circular knife edge cutter blade 24. The head 21 retains the body 23 on the shaft 20 to prevent axial displacement when the tool is inverted. The extremity of the cutter which coincides with the sharpened edge of the cutter blade forms a reference surface 25 adapted to slide on the upper face shoulder 5 of the reforming die 2 of the cartridge shell reforming machine. Rotation of the feed member 9 moves the cutter blade 24 to and from the mandrel 7. Between the point of engagement of the cutter blade 24 and the extremity of the mandrel, the mandrel is provided with a flat surface 26.

Operation of the tool for trimming cartridge shells is as follows: A cartridge shell to be reformed is placed in the reforming die 2 and the ram 4 is operated to force the cartridge shell into conformity with the die 2 and in the course of doing so, to force the unwanted end of the cartridge shell to protrude from the upper face shoulder 5 of the reforming die 2.

When the cartridge shell has been reformed but before it has been removed from the reforming die 2, the trimming tool is employed. This is accomplished by inserting the mandrel 7 into the cartridge shell as shown in FIGURE 1 until the reference surface 25 of the cutter blade rests on the upper face or shoulder 5. The feed screw 12 is then turned to force the cutter blade 24 into engagement with the cartridge shell. The supporting disc 6, the mandrel 7, and cutter blade 24, are rotated as a unit about the axis of the cartridge shell. In addition, the cutter rotates about its own axis. As the feed screw 12 is withdrawn, the cutter blade is forced into the cartridge shell unit the cartridge shell is severed to produce the new cartridge shell indicated by C in FIGURE 7.

By providing a set of mandrels 7 corresponding to the various diameters of cartridge shells, the tool for trimming a cartridge shell may be adapted to any type of cartridge shell.

Having fully described my invention, it is to be understood that I do not wish to be limited to the details herein set forth or to the details illustrated in the drawings, but my invention is of the full scope of the appended claims.

I claim:

1. The combination with a cartridge holder, of a cartridge trimming tool comprising: a manually rotatable support member; a mandrel secured thereto and adapted to journal in a cartridge shell; a cutter feed member journalled in said support member in eccentric relation to said mandrel; a circular cutter journalled eccentrically on said feed member whereby on rotation of said feed member said cutter is moved to and from said mandrel;

and means for rotating said feed member to cause said cutter to engage said cartridge shell fitted over said mandrel, said mandrel support member and cutter being rotatable as a unit about said cartridge shell to sever the cartridge shell.

2. A cartridge trimming tool comprising: means for receiving a cartridge shell and terminating in a shoulder surrounding the cartridge shell; a manually rotatable support member; a mandrel secured thereto and adapted to journal in said cartridge shell; a cutter feed member journalled in said support member in eccentric relation to said mandrel; a circular cutter journalled eccentrically on said feed member and having a reference surface adapted to ride on said shoulder to locate the cutter with respect to said cartridge shell; and means for rotating said feed member to cause said cutter to engage said cartridge shell fitted over said mandrel, said mandrel support member and cutter being rotatable as a unit about said cartridge shell to sever the cartridge shell.

3. The combination with a cartridge reforming tool wherein the open end of the reformed cartridge shell is caused to protrude from the reforming die, the end of the die defining the plane at which the cartridge shell is to be trimmed, of a trimming tool, comprising: a mandrel adapted to journal within said cartridge shell; a support member carried by said mandrel; a rotatable cutter carried by said support member at one side of said mandrel and having a circular cutting edge adapted to move across the end of said die to engage the cartridge shell; and means for feeding the cutter into cutting engagement with the cartridge shell, said mandrel, support member and cutter being rotatable as a unit about the axis of said cartridge shell to cause said cutter to sever the protruding end thereof.

4. The combination with a cartridge reforming tool wherein the open end of the reformed cartridge is caused to protrude from the reforming die, the end of the die defining the plane at which the cartridge shell is to be trimmed, of a trimming tool, comprising: a mandrel adapted to journal within said cartridge shell; a support member carried by said mandrel; a feed member journalled in said support member at one side of said mandrel; a rotatable cutter eccentrically mounted on said feed member for movement to and from said mandrel as said feed member is trimmed, said cutter including a circular cutting edge adapted to move across the end of said die to engage a cartridge shell held therein; and means for turning said feed member, said mandrel, support member and cutter being rotatable as a unit about the axis of said cartridge shell to cause said cutter to sever the protruding end thereof.

References Cited in the file of this patent

UNITED STATES PATENTS

| | | |
|---|---|---|
| 63,915 | McIntire | Apr. 16, 1867 |
| 348,441 | White | Aug. 31, 1886 |
| 2,350,535 | Sarulla | June 6, 1944 |
| 2,359,954 | Whipple | Oct. 10, 1944 |
| 2,606,359 | Stadthaus | Aug. 12, 1952 |
| 2,887,923 | Miller | May 26, 1959 |
| 3,039,342 | Parsons et al. | June 19, 1962 |

FOREIGN PATENTS

| | | |
|---|---|---|
| 3,633 | Great Britain | Dec. 21, 1867 |